June 27, 1939.  J. H. KAUTSKY  2,164,016
EXTRACTOR
Filed Aug. 15, 1935
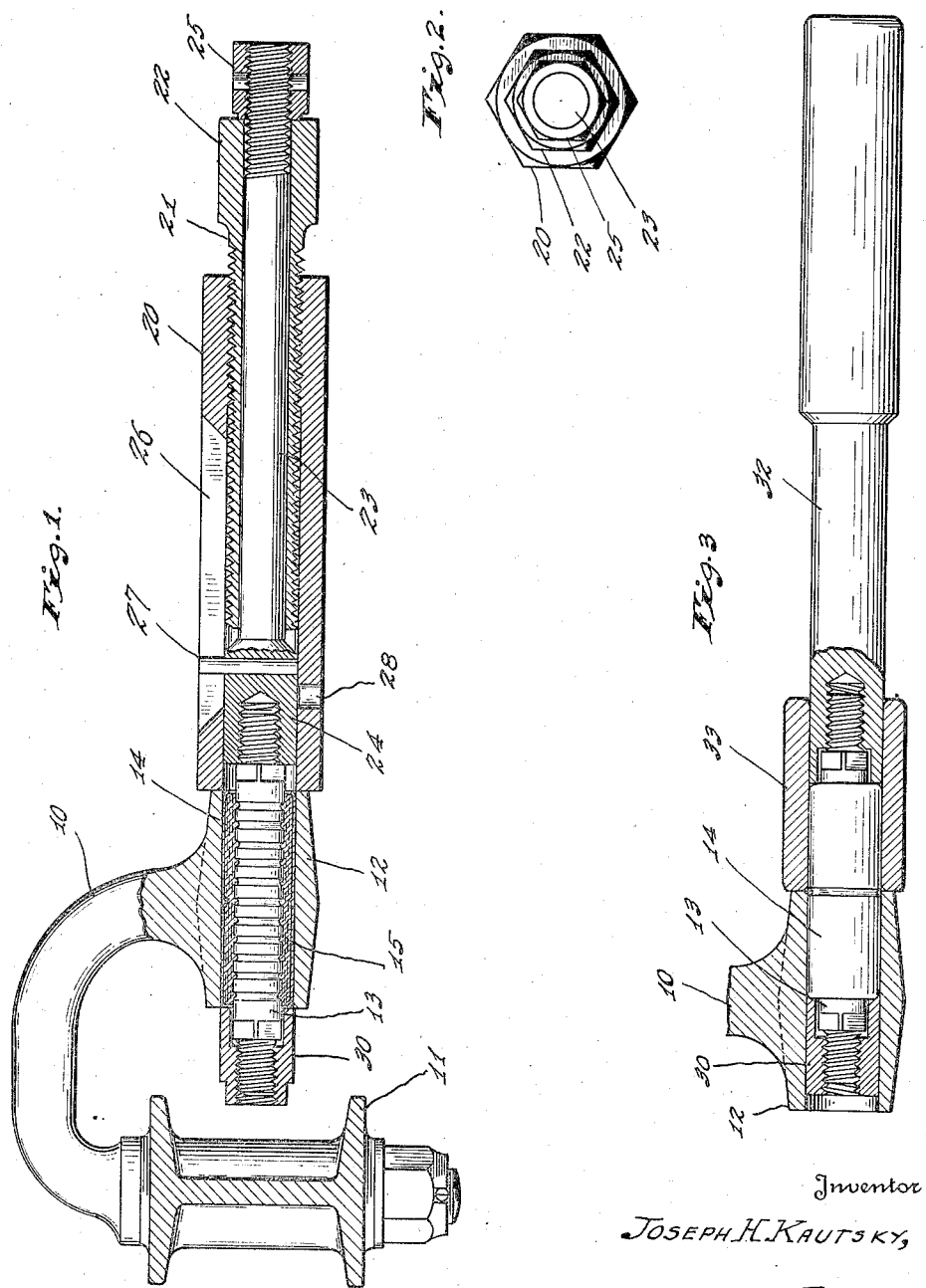
Inventor
JOSEPH H. KAUTSKY,
By
Attorneys Patented June 27, 1939

2,164,016

UNITED STATES PATENT OFFICE 2,164,016

EXTRACTOR

Joseph H. Kautsky, Indianapolis, Ind., assignor to Oscar C. Catterlin, Indianapolis, Ind.

Application August 15, 1935, Serial No. 36,341

2 Claims. (Cl. 29—86.1)

My invention relates to a tool suitable for use in the extraction of bolts, pins, or bushings from seats within which they fit tightly, and particularly to a tool suitable for use in extracting the spring shackle bolts and their associated bushings in automobiles. In one form of construction used in present-day automobiles, the spring shackle bolt is disposed within a thin-walled metal bushing or sleeve of materially larger diameter than the bolt, the space between the bolt and sleeve being filled with some suitable lubricant-impregnated material. The sleeve is of a diameter such that it has a tight press fit within the part which receives it; and because of the tightness of this fit, great difficulty is experienced in removing the sleeve. In some instances it is possible to drive the bolt-and-sleeve assembly out of the part in which it is mounted; but in other instances the shackle bolt and bushing have not been accessible for removal in this fashion.

It is the object of my invention to produce a tool of the type indicated which may be used for the withdrawal of shackle bolts, bushings, and similar parts, and which will be particularly suited for use in situations where the desired removal can not be effected by driving. A further object of my invention is to produce a device of this kind which may be simply and economically constructed, which will be of adequate strength, and which can be used in exceedingly close quarters.

In carrying out my invention I provide for the device a body having a longitudinal screw-threaded hole extending through it, such hole being counterbored at one end for a depth approximately equal to the length of the shackle-bolt bushing which is to be withdrawn. Within the screw-threaded body I mount a screw-threaded sleeve having an axial passage extending completely through it; and within this sleeve I dispose a longitudinally slidable rod one end of which is provided with an axial screw-threaded recess for the reception of the shackle bolt and the other end of which is provided with a head adapted to abut against the outer end of the sleeve. These parts constitute a unitary assembly in addition to which my invention comprises a nut of cylindrical form and threaded to receive one end of the shackle bolt, the nut having a diameter slightly smaller than the shackle-bolt bushing.

The accompanying drawing illustrates an embodiment of my invention: Fig. 1 is a vertical section through the front axle of an automobile showing my tool in position to effect the withdrawal of a shackle-bolt mounted in the spring perch supported from the axle; Fig. 2 is an end elevation of the tool; and Fig. 3 is a view somewhat similar to Fig. 1 showing how parts of the device illustrated in Fig. 1 may be employed in assisting in the insertion of a shackle bolt and its associated bushing.

The axle and perch construction illustrated in Fig. 1 is one found in the 1936 Ford automobile. The spring perch 10 is secured to the axle 11 and has, disposed at the side of the axle, a head 12 drilled for the reception of the shackle bolt 13. The shackle-bolt proper is not mounted directly in the spring perch, but instead is disposed within a sleeve 14 of larger diameter than the bolt, the space between the sleeve and bolt being filled with some suitable lubricant-impregnated material 15 and the ends of the sleeve being bent inwardly to retain the lubricant-impregnated material in place. The sleeve 14 has a very tight press fit within the head 12 of the perch, and considerable force must be exerted to remove it.

The extracting tool illustrated in the drawing comprises an elongated body 20, conveniently of hexagonal cross-section. The body is provided with an axially extending bore the outer end of which is screw-threaded for the reception of a screw-threaded sleeve 21 having a polygonal head 22. The sleeve 21 slidably receives a rod 23 the inner end of which is provided with an integral head 24 having a central screw-threaded recess adapted to receive the threaded end of the shackle bolt 13. The outer end of the rod 23 is provided with a head 25 against which the outer end of the sleeve 21 abuts.

To prevent relative rotation of the rod 23 and body 20, I may provide the body with a longitudinally extending slot 26 which receives the outer end of a pin 27 carried by the head 24. An opening 28 in the body 20 diametrically opposite the slot 26 provides for the insertion (or removal) of the pin 27.

The tool as so far described is applied to the shackle bolt as indicated in Fig. 1, the inner end 24 of the rod 23 being screwed over the threaded outer end of the shackle bolt and the inner end of the body seated against the head 12 of the spring perch. By rotating the sleeve 22, axial pressure can be applied to the outer head 25 of the rod 23, thus tending to move the rod 23 outwardly in the body 20 and to bring the shackle bolt 13 with it. The tightness of the fit of the sleeve 14 within the spring perch is such that the shackle bolt 13 could, by the use of the extracting tool, be pulled out of the sleeve, leaving the sleeve behind in the perch. To prevent this, I employ the nut 30 which is screw-threaded on the inner end of the shackle bolt and which is counterbored for the reception of the unthreaded portion of the shackle bolt to permit its engagement with the end of the sleeve 14. The nut 30 has a diameter a few thousandths of an inch less than that of the sleeve 14, so that it may pass freely through the hole in the perch.

In the assembly as described, when the sleeve 22 is rotated in the body 20 to cause the rod 23 to be forced outwardly therein, the nut 30 applies an outwardly directed pressure to the inner end of the sleeve 14, and the shackle bolt 13 and the sleeve 14 are withdrawn as a unit from the perch into the bore of the body 20.

In addition to serving its function above described, the nut 30 may be used as a pilot in inserting an assembly of shackle bolt and bushing, as indicated in Fig. 3. Here the nut 30 is screwed on the inner end of the new shackle bolt and acts as a pilot guiding it into the perch. The other end of the shackle bolt is screw-threaded into a driving rod 32 the end of which is counterbored to permit it to abut against the end of the bushing 14. A body in the form of a heavy collar 33 having an internal diameter slightly greater than that of the bushing 14 is disposed over the bushing and against the face of the spring perch. At the beginning of the insertion operation, the bushing 14 lies practically wholly within the collar 33; but by driving against the outer end of the rod 32 the shackle bolt and bushing are transferred from the collar 33 to the spring perch, the collar 33 serving to prevent the thin-walled bushing 13 from expanding under the axial pressure imposed upon it.

I claim as my invention:

1. A tool for moving axially in its support a bolt and bushing assembly comprising a bushing, a bolt therein, and yieldable packing material between said bushing and bolt, the ends of said bolt being screw-threaded and projecting outwardly beyond the ends of said bushing; said tool comprising a body engageable at one end with one end of said support and having in such end an axial bore for the reception of said assembly, a rod extending longitudinally through said bore and having in its end a screw-threaded recess for the reception of the adjacent end of said bolt, a nut threaded for the reception of the other end of said bolt, said nut having a diameter approximating that of said bushing and having its inner face counterbored, and means acting between said rod and said body for withdrawing said assembly from the support.

2. The invention set forth in claim 1 with the addition that said rod is provided with an abutment, said withdrawing means comprising a sleeve screw-threadedly mounted in said body, surrounding said rod, and engaging said abutment.

JOSEPH H. KAUTSKY.